(12) United States Patent  
Cooke

(10) Patent No.: US 9,035,919 B2  
(45) Date of Patent: May 19, 2015

(54) ELECTROSTATICS STYLUS

(71) Applicant: Microchip Technology Incorporated, Chandler, AZ (US)

(72) Inventor: Benjamin T. Cooke, Denver, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 154 days.

(21) Appl. No.: 13/842,869

(22) Filed: Mar. 15, 2013

(65) Prior Publication Data

US 2014/0267187 A1  Sep. 18, 2014

(51) Int. Cl.
*G06F 3/0354*  (2013.01)
*G06F 3/044*  (2006.01)

(52) U.S. Cl.
CPC .......... *G06F 3/03545* (2013.01); *G06F 3/044* (2013.01)

(58) Field of Classification Search
USPC ........................................... 345/179
See application file for complete search history.

(56) References Cited

U.S. PATENT DOCUMENTS

| | | | |
|---|---|---|---|
| 8,089,470 B1* | 1/2012 | Schediwy et al. | 345/173 |
| 2008/0128180 A1* | 6/2008 | Perski et al. | 178/18.03 |
| 2012/0154340 A1* | 6/2012 | Vuppu et al. | 345/179 |
| 2013/0342510 A1* | 12/2013 | Yeh et al. | 345/179 |
| 2014/0043279 A1* | 2/2014 | Pedersen et al. | 345/174 |

\* cited by examiner

*Primary Examiner* — Charles V Hicks
(74) *Attorney, Agent, or Firm* — King & Spalding L.L.P.

(57) ABSTRACT

A handheld, stylus-type input device for interfacing with a touch screen having an array of sensor nodes (e.g., a capacitive touch screen) may include a handheld body having a first end, a tip at the first end, an electrode arranged at least partially within the body, and a circuit configured to produce an electrical potential on the electrode to generate an electric field proximate the stylus tip. When the stylus tip is placed in contact with the touch screen, the electric field activates one or more sensor nodes outside of a physical contact area between the tip and the touch screen, producing an effect on the sensor nodes similar to that of a finger or other object having a larger contact area with the touch screen than the stylus, thus providing activation of the touch screen while providing better view of the screen near the point of contact.

20 Claims, 4 Drawing Sheets

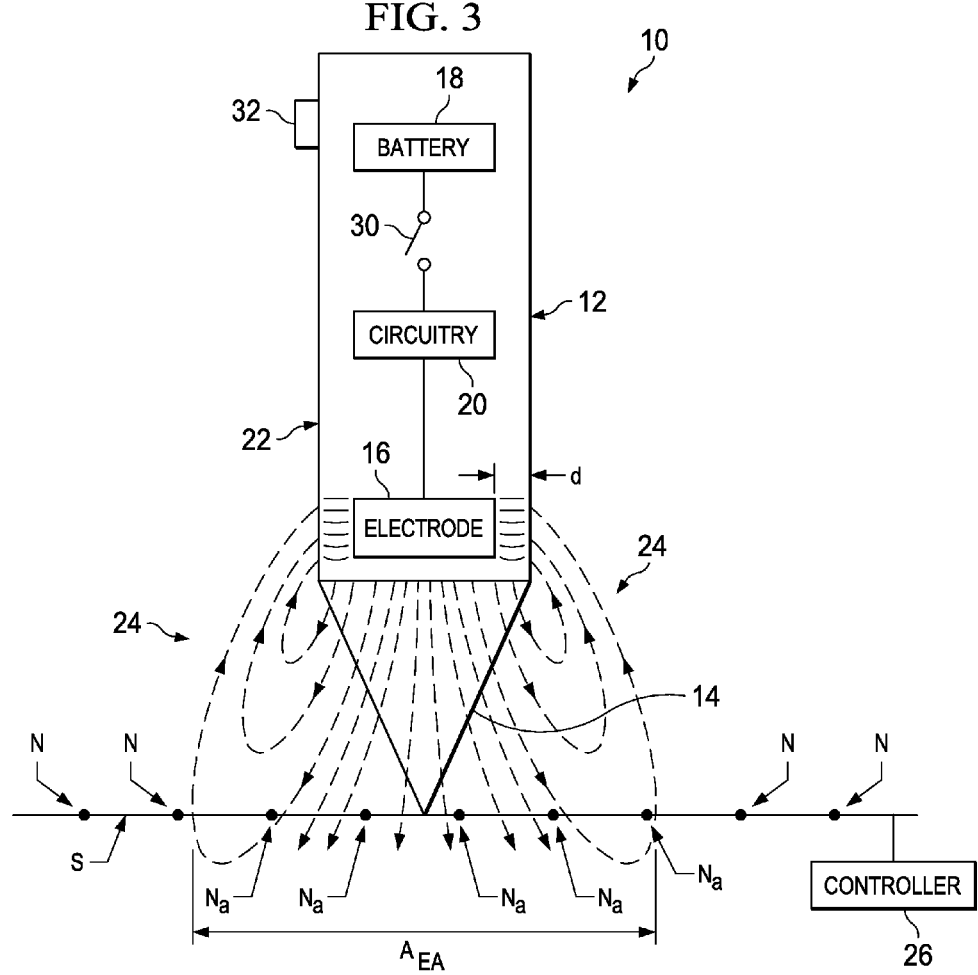

ELECTROSTATICS STYLUS

TECHNICAL FIELD

The present disclosure is related to a stylus for interfacing with an electronic device, e.g., a stylus that generates an electric field (e-field) that is detectable by a projected capacitive touch screen of an electronic device, such as a smart phone, tablet, e-reader, etc.

BACKGROUND

Many electronic devices include projected capacitive touch screens, commonly referred to as PCT or PCAP screens, such as smart phones, tablets, e-readers, etc. A typical PCAP screen is made up of a matrix of rows and columns of conductive material, layered on sheets of glass. This can be done either by etching a single conductive layer to form a grid pattern of electrodes, or by etching two separate, perpendicular layers of conductive material with parallel linear electrodes or "tracks" to form a grid. The electrodes of the single conductive layer in the former approach or the location where the linear electrodes of each layer overlap in the latter approach form the sensor nodes of the touch screen. Voltage applied to this grid creates a electrostatic field, which can be measured. When a object with enough additional charge-holding capability, such as a fingertip, comes into contact with a PCAP panel, it alters the local electrostatic field at that point and thus produces a measurable change in the charge of the electrodes at or near the point of contact. The capacitance can be changed and measured at every individual point on the grid (intersection). Accordingly, the location of the center of the touch can be determined at a resolution finer than the spacing between the electrodes by interpolation between affected adjacent electrodes. Therefore, this system is able to track touches by a fingertip or other object that produces a measurable change at a plurality of adjacent electrodes at a resolution much better than the spacing of those electrodes; for example, a touch screen with electrodes spaced 5 millimeters apart may be able to interpolate the position of the center of a touch that affects multiple electrodes with an accuracy better than 0.5 millimeters. However, if the object produces a measurable change at only one electrode, interpolation is not possible and the position of the touch can only be measured at the resolution of the electrode spacing.

Although a PCAP screen can typically sense some types of passive stylus, most PCAP screens currently on the market are designed to interact with a finger. Accordingly, a PCAP screen may require that the area of contact with the screen have a minimum centroid area of about ¼ inch in diameter in order to detect a touch. However, a finger does not produce a very good user experience when trying to emulate the actions of a writing utensil such as a pen or pencil due to the physical size of the point of contact required for detection.

FIG. 1 illustrates a portion of a conventional PCAP touch screen, showing an array of sensor nodes N defined at the intersection of orthogonal sensor tracks T. A contact area formed by a finger in contact with the touch screen is indicated by the dashed line A. Each sensor node within the contact area A is activated, that is, has a measurable change in its stored charge or its capacitance, as indicated by an enlarged dot at each activated node Na. Signals from the array of sensors are communicated to a controller, which calculates a centroid area and/or center of area A based on the activated nodes Na. The controller may require a minimum contact area, diameter, or other dimension in order to identify the detected contact area A as a user input.

FIGS. 2A-2C illustrate side views of example objects contacting a conventional PCAP touch screen having a controller that require a minimum contact area, diameter, or other dimension, indicated as $A_{min}$, to detect a user input. In some designs, the minimum contact area may be defined by a minimum number of activated nodes Na. FIG. 2A illustrates a finger in contact with the screen, wherein the area of contact is greater than the minimum contact dimension $A_{min}$, and thus the controller detects a user input. Similarly, FIG. 2B illustrates a stylus SLT having a large tip LT in contact with the screen, wherein the area of contact is greater than the minimum contact dimension $A_{min}$, and thus the controller detects a user input. However, FIG. 2C illustrates a stylus SFP having a fine-point tip FT in contact with the screen, wherein the area of contact is less than the minimum contact dimension $A_{min}$, and thus the controller does not detect a user input at multiple electrodes (or even at one electrode if the fine-point tip is sufficiently far from the closest electrode) and therefore the controller can not accurately determine the location of the touch.

Thus, passive styli currently used for such screens achieve this minimum centroid area using a relatively large tip, e.g., in the form of a relatively large rubber or foam tip. However, this large tip obscures the user's view of the point of contact with the screen. Alternatively, some PCAP screens provide an increased sensor density (e.g., increased line or track density) in order to detect a fine-point stylus. However, increasing the sensor density typically increases the costs for both the sensor array and the associated controller. These disadvantages are even more pronounced in devices with larger touch screens, e.g., tablets and e-readers.

SUMMARY

The present disclosure is related to a stylus for interfacing with an electronic device, e.g., a stylus that generates an electric field (e-field) that is detectable by a projected capacitive touch screen of an electronic device, such as a smart phone, tablet, e-reader, etc.

One embodiment provides a handheld, stylus-type input device, including a handheld body having a first end, a tip at a first end of the body, an electrode arranged at least partially within the body, and a circuit coupled to the electrode and configured to produce an electrical potential on the electrode, which generates an electric field for activating a plurality of sensor nodes of a touch screen when the tip is placed in contact with the touch screen.

In a further embodiment, when the tip is placed in contact with the touch screen, a contact area between the tip and the touch screen is less than a minimum contact area defined by the touch screen to detect user input.

In a further embodiment, the input device is configured such that, when the tip is placed in contact with the touch screen, the electric field activates one or more sensor nodes outside of a contact area between the tip and the touch screen.

In a further embodiment, the input device further includes at least one conductive element configured to shape the electric field produced by the electrode.

In a further embodiment, the at least one conductive element comprises a conductive outer housing, wherein the electrode is arranged at least partially within the conductive outer housing.

In a further embodiment, the conductive outer housing comprises an elongated tube, and wherein the electrode is arranged at least partially within the elongated tube and near a first end of the elongated tube.

In a further embodiment, the at lest one conductive element forms a part of an elongated hand-held body of the input device.

In a further embodiment, the input device further includes a battery coupled to the circuit.

In a further embodiment, the electrode is electrically isolated within the input device.

In a further embodiment, the input device further includes a boost converter coupled to the electrode.

In a further embodiment, the input device further includes a voltage multiplier coupled to the electrode.

In a further embodiment, the circuit includes a microcontroller configured to output an AC voltage at an output and a transformer coupled to the output and configured to increase the AC voltage.

In a further embodiment, the microcontroller is configured to receive a feedback voltage and automatically control the electric potential on the electrode based on the feedback voltage.

In a further embodiment, the electric potential supplied to the electrode is between 500V and 50 kV.

In a further embodiment, circuitry between the at least one battery and the electrode supplies the electrode with a voltage of between 1 kV and 10 kV.

In a further embodiment, the electrode is arranged at a predefined distance from a contact point of the tip such that when the contact point of the tip is placed in the contact with the touch screen, the electrode is spaced apart from the touch screen by approximately the predefined distance.

In a further embodiment, the tip is electrically insulated to prevent discharge between the electrode and the touch screen.

Another embodiment provides a handheld, stylus-type input device, comprising a handheld body having a first end; a tip at a first end of the body; an elongated electrode arranged at least partially within the body and extending along a direction of a longitudinal axis; and a circuit coupled to the electrode and configured to produce an electrical potential on the electrode, which generates an electric field; wherein in a plane extending perpendicular to the longitudinal axis and passing through a forward-most point or surface of the tip, and at a distance of 3 mm from a point of intersection between the longitudinal axis and the plane, the electric field generated by the electrode has a field strength of at least 1,000 V/m.

In a further embodiment, the electric field generated by the electrode has a field strength of between 3,000 V/m and 50,000 V/m in the plane and at the distance of 3 mm.

Another embodiment provides an apparatus including a touch screen having an array of sensor nodes, and a handheld, stylus-type input device including a handheld body having a first end, a tip at a first end of the body, an electrode arranged at least partially within the body, and a circuit coupled to the electrode and configured to produce an electrical potential on the electrode, which generates an electric field for activating a plurality of the sensor nodes of the touch screen when the tip is placed in contact with the touch screen.

Another embodiment provides an apparatus including a capacitive touch screen having an array of sensor nodes, and an input device configured to provide input to the electronic device via interaction with the capacitive touch screen, the input device including an elongated hand-held body, a tip at a first end of the elongated hand-held body, a conductive element, and an electrically chargeable electrode arranged near the tip and relative to the conductive body and configured to receive an electric potential for generating an electrostatic field between the electrode and the conductive element, wherein the input device is configured such that, when the tip is placed in contact with the capacitive touch screen, the electrostatic field activates one or more sensor nodes outside of a physical contact area between the tip and the capacitive touch screen.

BRIEF DESCRIPTION OF THE DRAWINGS

Some embodiments of the disclosure may be understood by referring, in part, to the following description and the accompanying drawings wherein:

FIG. 2A illustrates a finger in contact with the screen, FIG. 2B illustrates a large-tip stylus in contact with the screen, and FIG. 2C illustrates a fine-tip stylus in contact with the screen.

FIG. 3 illustrates an example hand-held electrostatic stylus for interfacing with a capacitive touch screen (e.g., a PCAP sensor touch screen), according to one example embodiment.

DETAILED DESCRIPTION OF THE DRAWINGS

Figure 1:
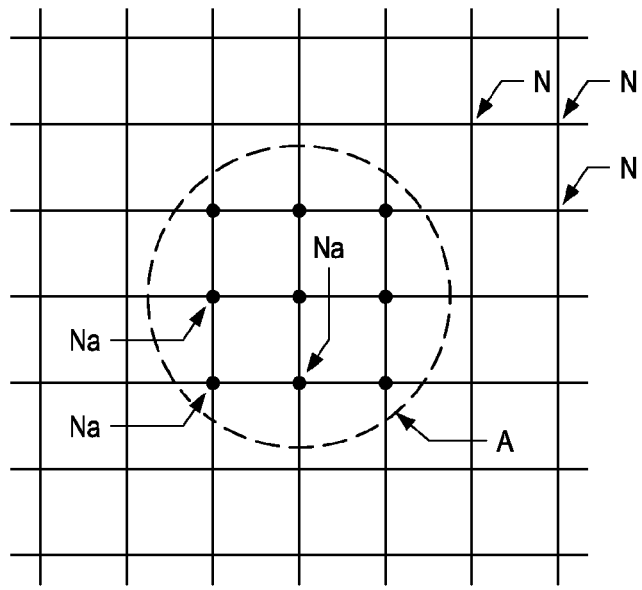
FIG. 1 illustrates a portion of a conventional PCAP touch screen including an array of sensor nodes.
Figure 2A:
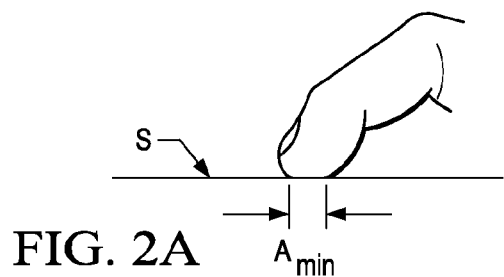
FIGS. 2A-2C illustrate side views of example objects contacting a conventional PCAP touch screen. In particular.
Figure 2B:
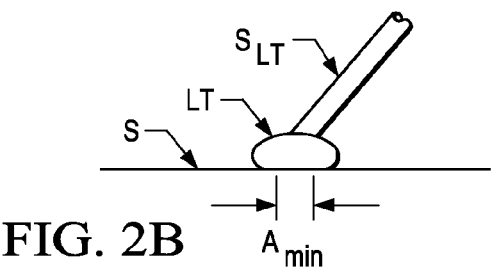
Figure 2C:
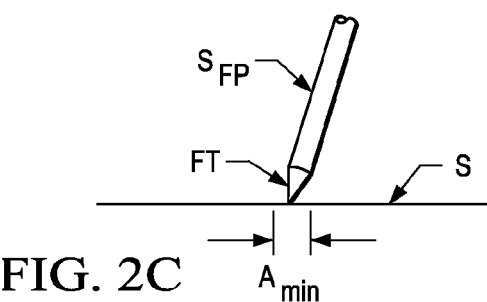

Some embodiments of the disclosure may be understood by referring, in part, to the following description and the accompanying drawings, in which like reference numbers refer to the same or like parts.

Some embodiments provide an electrostatic stylus that creates an e-field of suitable intensity and shape to activate multiple sensor nodes a PCAP capacitive touch screen, e.g., to emulate a finger touching the screen. This allows a fine-point tip to be used at the end of a stylus device, e.g., similar to a pen or pencil, that does not significantly obscure the user's view of the point of contact on the screen. With an electrostatic stylus as disclosed herein, fine tip stylus input may be detected with a high resolution without requiring a higher density of sensor elements to detect a smaller centroid area. By reducing the required density of sensor elements for stylus input, the cost and/or complexity of the system's PCAP sensor and controller may be reduced as compared with conventional high-density PCAP sensor systems having a similar a ability to accurately measure the contact location of a fine-tipped stylus.

FIG. 3 illustrates an example hand-held electrostatic input device 10 for interfacing with a capacitive touch screen S (e.g., a PCAP sensor touch screen) having an array of sensor nodes N, according to one example embodiment. The example hand-held input device 10 may be referred to as a stylus 10, and may have a shape generally similar to a pen, pencil, or a pointer. Stylus 10 may include an elongated hand-held body 12 configured to be held by a user, and a tip 14 at a first end of the elongated hand-held body 12, the tip 14 being configured for contact with the capacitive touch screen S.

The elongated hand-held body 12 may house an electrically charged electrode 16 charged by a battery 18 and controlled or regulated by any suitable circuitry 20. The charged electrode 16 is arranged relative to a conductive element 22 such that an electrostatic field 24 is generated between the charged electrode 16 and the conductive element 22, which electrostatic field 24 has a suitable shape and intensity to activate one or more sensor nodes N outside of a physical contact area between the stylus tip 14 and the capacitive touch screen S, when a contact portion 15 (e.g., a point or small flattened portion) of tip 14 is placed in contact with or very close to the screen S. The sensor nodes activated by the electrostatic field 24 are indicated in FIG. 3 as nodes Na, and the area of nodes Na activated by the electrostatic field 24 is indicated as area AEA. In some embodiments, the generated electrostatic field 24 is generally circular in a plane perpendicular to the elongated axis of the stylus and passing through the screen-contacting end of the tip 14, such that in the plane of the screen S, the activated area AEA is generally circular when the stylus 12 is oriented perpendicular to the screen S, and generally oval shaped when the stylus 12 is oriented at an angle offset from perpendicular. Other embodiments may produce electrostatic fields 24 that provide activated areas AEA of any other suitable shape, e.g., generally square, rectangular, triangular, etc.

A controller 20 receives inputs from sensors nodes N of touch screen S. The shape, size, or relevant dimension of activated area AEA (e.g., as measured by the number of activated sensor nodes Na) may be sufficient for controller 20 to detect a user input. Thus, by generating an electrostatic field 24, stylus 12 may activate the touch screen S despite having a physical contact area with the screen (via contact portion 15) that would otherwise be too small to activate the touch screen S. Thus, a fine-point stylus may be used with a capacitive touch screen S having a relatively low sensor density as compared with the sensor density needed for detecting a touch by a conventional fine-point stylus.

Some embodiments provide more than one battery 18, charged electrode 16, conductive element 22, and/or electrostatic field 24. However, for the sake of simplicity, the following discussion refers to a single battery 18, electrode 16, conductive element 22, and electrostatic field 24.

In order to generate the appropriately shaped electrostatic field 24, the charged electrode 16 may be physically spaced apart from or otherwise electrically insulated or isolated from the conductive element 22, e.g., to prevent or resist discharge through the conductive element 22. Conductive element 22 may act as a ground relative to the charged electrode 16. The electrode 16 and conductive element 22 may comprise any elements with any suitable shape, size, material, and relative arrangement to generate a suitable electrostatic field 24 for providing a desired activated area AEA (e.g., sufficient for controller 20 to detect a user input, as discussed above). Electrode 16 and conductive element 22 may be formed from any suitable material or materials, e.g., any suitable metal, metals, or non-metallic conductive materials, alone or in combination.

Figure 4:
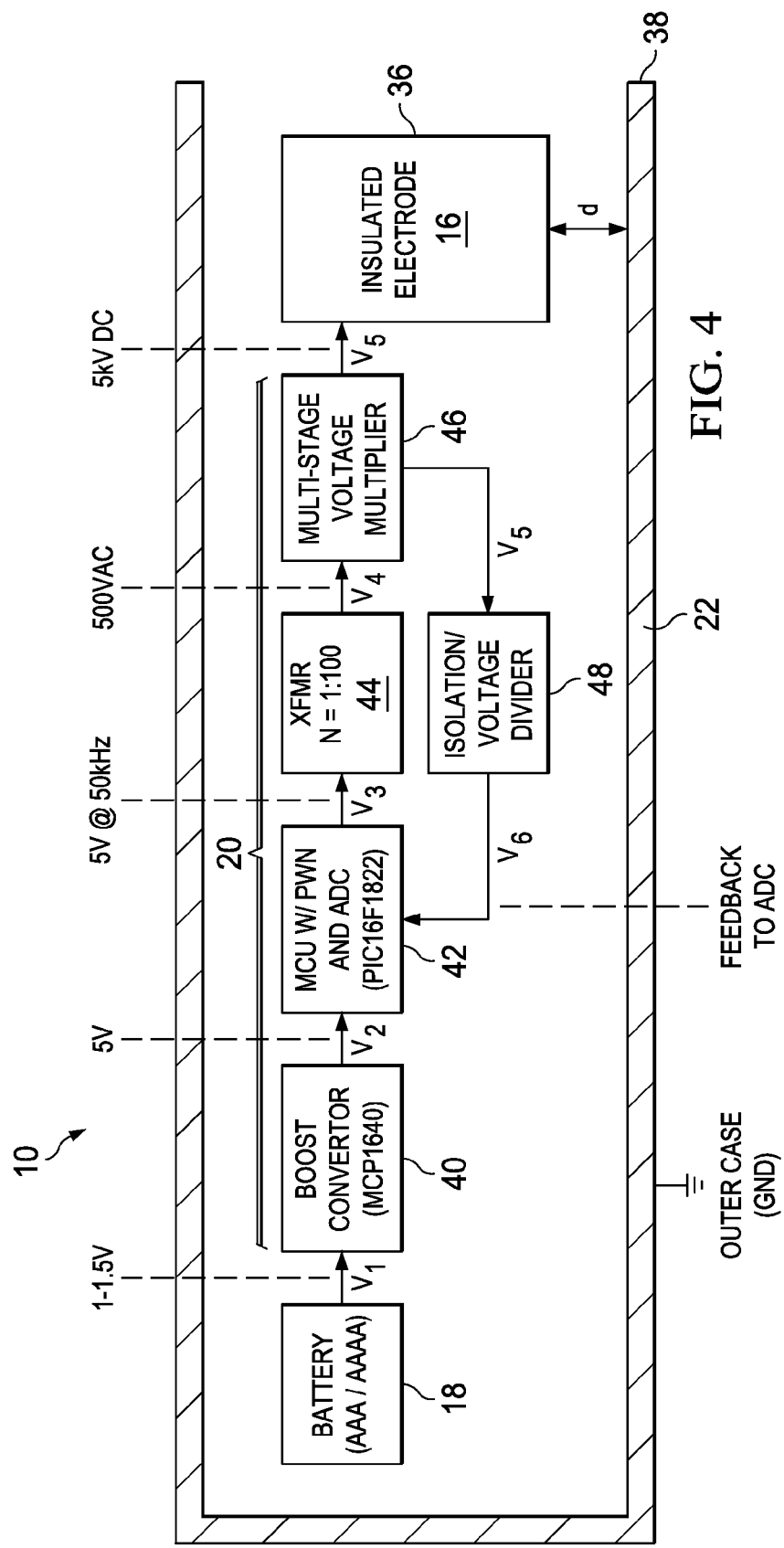
FIG. 4 illustrates an example circuit for a hand-held electrostatic stylus according to an example embodiment.

In some embodiments, conductive element 22 comprises an outer housing, with the charged electrode 16 arranged at least partially within the outer housing. For example, in the illustrated embodiment, the conductive element 22 comprises an elongated metal tube, and the charged electrode 16 is arranged at least partially within the elongated metal tube and near a first axial end of the elongated tube. With reference to FIG. 4, a leading end 36 of electrode 16 may extend beyond a leading end 38 of the elongated tube 22, or vice versa (as shown in FIG. 4), or the leading ends 36, 38 of the electrode 16 and elongated tube 22 may be coplanar or substantially coplanar. In some embodiments, e.g., the example embodiment shown in FIG. 3, the conductive element 22 forms an integral part of the elongated hand-held body 12, e.g., the outer housing configured be held by the user.

The size and/or shape of the electrostatic field 24 generated by the stylus 12, and thus the size and/or shape of activated area AEA at the touch screen S, may be adjusted by varying the distance between the electrode 16 and the conductive element 22, indicated as distance "d" in FIG. 3. The stylus tip 14 may be formed from a non-conducting material or otherwise electrically insulated from the electrode 14 to prevent or resist electrical discharge between the charged electrode 16 and the capacitive touch screen S. For example, the tip 14 may be formed from plastic.

The stylus tip 14 may be shaped and sized such that the charged electrode 16 is arranged at a predefined distance from the contact portion 15 of the tip 14 such that when the contact portion 15 is placed in the contact with the capacitive touch screen S, the charged electrode 16 is spaced apart from the touch screen S by a predefined distance that provides a desired activated area AEA on the touch screen S.

As discussed above, the electrode 16 may be charged by a battery 18 and controlled or regulated by any suitable circuitry 20. In some embodiments, stylus 12 may include an electrical switch 30 between the battery 18 and electrode 16, which switch 30 may be controlled by a manual on/off button 32 or other suitable actuator. In other embodiments, on/off switch 30 may automatically control the on/off status of stylus 12, i.e., the connection between battery 18 and electrode 16. For example, on/off switch 30 may include a sensor configured to automatically detect whether the stylus 12 is held by a person and circuitry configured to automatically control the on/off status accordingly. As another example, on/off switch 30 may include a sensor configured to automatically detect whether the stylus 12 is in contact with (or in close proximity to) the capacitive touch screen S, and circuitry configured to automatically control the on/off status accordingly.

FIG. 4 illustrates an example circuit for a hand-held electrostatic stylus 12 according to an example embodiment. As discussed above, stylus 12 may include an electrode 16 charged by a battery 18 via circuitry 20. Battery 18 may include any number and/or type of battery. For example, battery 18 may be one or more AAA or AAAA batteries. In another example embodiment, battery 19 may be a rechargeable battery that is recharged when the stylus is placed in a holder or dock. Where battery 19 is rechargeable, it may be recharged via direct electrical contacts or by inductive or capacitive coupling.

In the illustrated example embodiment, circuitry 20 includes a boost converter 40, a microcontroller 42, a transformer 44, a voltage multiplier 46, and an isolation/voltage divider element 48.

Boost converter 40 boosts the voltage V1 supplied by the battery 18 to a boosted voltage V2. For example, boost converter 40 may be a MCP1640 chip manufactured by Microchip Technology Inc. or any other similar chip known in the art.

Microcontroller 42 converts the voltage V2 to an alternating current voltage V3 using pulse width modulation. Microcontroller 42 may also be configured to receive a feedback voltage V6 from the isolation/voltage divider element 48, convert the feedback voltage V6 to a digital signal using an analog-to-digital converter, and automatically control the output voltage V3 based on the received feedback voltage V6. For example, microcontroller 42 may be a PIC16F1822 chip manufactured by Microchip Technology Inc. or any other similar chip known in the art.

Transformer 44 is configured to increase the voltage V3 to a higher AC voltage V4, by any suitable amount. For example, transformer may be a 1:100 transformer.

Voltage multiplier 46 increases and converts the AC voltage V4 to a higher DC output voltage V5, which is supplied to the insulated electrode 16. In addition, the DC output voltage V5 may be supplied to the isolation/voltage divider element 48, which reduces the voltage to a feedback voltage V6 delivered to the microcontroller 42, and which isolates the microcontroller 42 from the output voltage of voltage multiplier 46, to protect microcontroller 42 from damage. In some embodiments, voltage multiplier 46 is a multi-stage voltage multiplier.

As discussed above, microcontroller 42 converts the feedback voltage V6 to digital signals and controls the output voltage V3 in order to regulate the voltage supplied to electrode 16.

As an example only, in the embodiment shown in FIG. 4, battery 18 supplies a voltage of 1 to 1.5V, boost converter boosts the voltage to 5V, microcontroller 42 coverts the voltage to 5V at 50 kHz, transformer 44 increases the voltage to 500V AC, and multi-stage voltage multiplier 46 coverts and increases the voltage to 5 k DC, which is supplied to the electrode 16. In other embodiments, circuitry 20 may include any similar or additional components to provide any suitable voltage increases, conversions, or other manipulations to supply a desired voltage to electrode 16. In some embodiments, circuitry 20 is configured to supply a voltage of between 100V and 50 kV to electrode 16. For example, circuitry 20 may be configured to supply a voltage of between 1 kV and 10 kV to electrode 16. In particular embodiments, such as the illustrated example of 5 kV, circuitry 20 supplies a voltage of between 4 kV and 6 kV to electrode 16. In some embodiments, the voltage supplied to electrode 16 may be selected by the user of the stylus through any number of means known to those of ordinary skill in the art, such as a switch on the stylus or commands sent to the microcontroller over a wired or wireless communication link.

Figure 5:
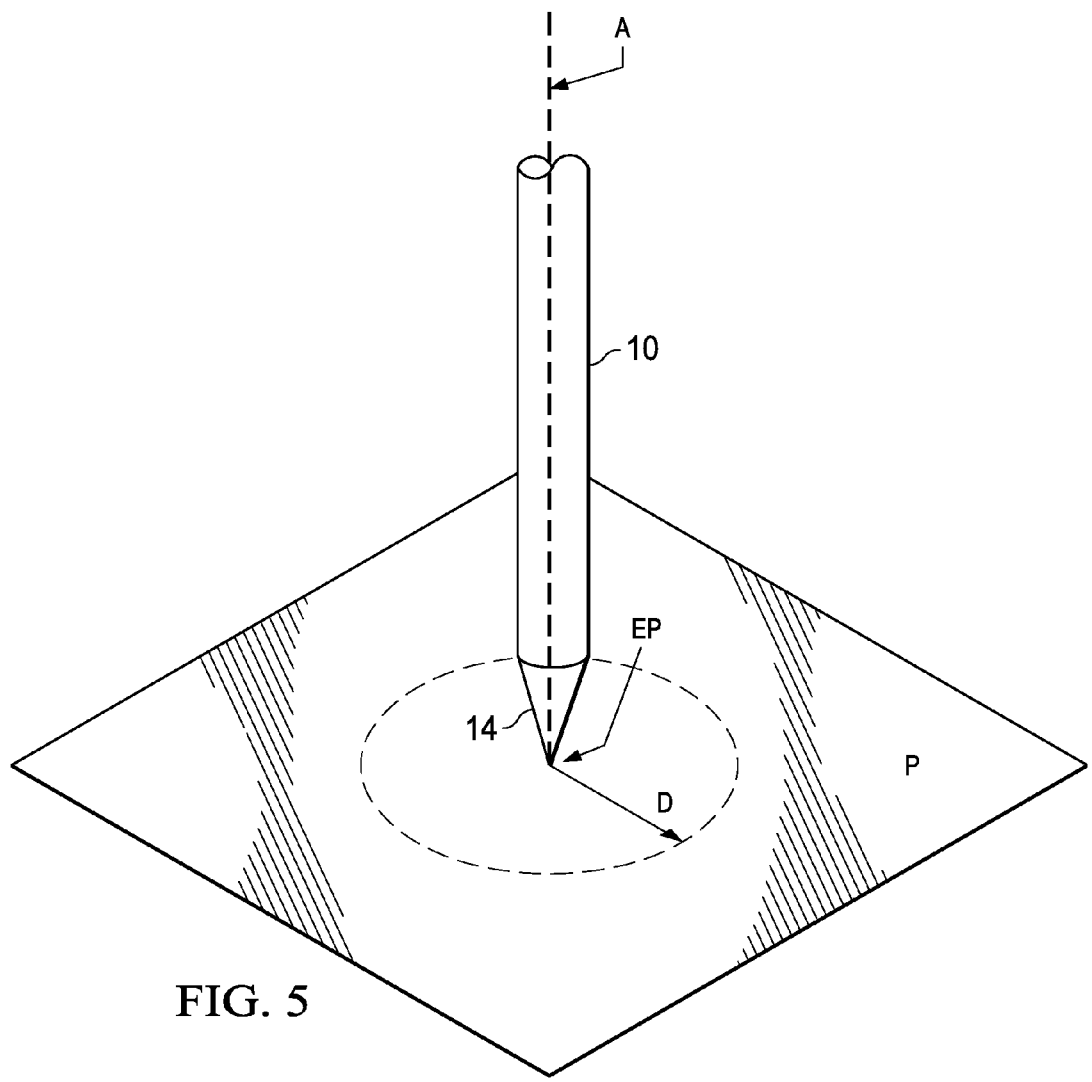
FIG. 5 illustrates an example electrostatic stylus and a reference plane and reference dimensions for describing the electric field strength provided by the stylus in certain example embodiments.

FIG. 5 illustrates an example electrostatic stylus 10 and a reference plane P and reference dimensions for describing the electric field strength provided by the stylus in certain example embodiments. The reference plane P extends perpendicular to a longitudinal axis A of the electrode 16 in the stylus 10 and passes through the forward-most point or surface of the stylus 14, along the longitudinal axis A. The intersection of longitudinal axis A and plane P is indicated as point EP, which in some embodiments (e.g., where stylus 10 is symmetrical about axis A) may correspond with the forward-most point of the stylus 14 (or the center of the forward most surface, in embodiments in which the stylus tip 14 ends in generally flattened surface perpendicular to axis A). Thus, the electric field strength at plane P (provided by electrode 16) generally represents the electric field strength experienced by a touch screen when stylus tip 14 is placed in contact with the surface of the touch screen. Distances D represents a distance from point EP within plane P, e.g., for discussing the electric field strength at particular distances radially outward from the point/area of contact between stylus tip 14 and the touch screen, as discussed below.

The electric field strength generated by electrode 16 depends on a number of selectable or adjustable parameters, including the voltage supplied to electrode 16, the distance between the electrode 16 and the conductive element 22, indicated as distance "d" in FIG. 3, the distance between electrode 16 and the touch screen surface (represented by plane P in FIG. 5) in the axial direction, etc. Thus, any of these parameters may be selected and/or adjusted as desired in different embodiments to provide a desired electric field strength, for example at a particular distance (e.g., distance D shown in FIG. 5) from the point/area of contact between stylus tip 14 and the touch screen.

In various embodiments, at an example distance D=1 mm, parameters of stylus 10 may be selected and/or adjusted such that electrode 16 provides an electric field strength of (a) at least 1,000 V/m, or (b) at least 3,000 V/m, or (c) at least 10,000 V/m, or (d) at least 20,000 V/m, or (e) between 1,000 and 50,000 V/m, or (f) between 3,000 and 50,000 V/m, or (g) between 10,000 and 50,000 V/m, or (h) between 1,000 and 25,000 V/m, or (i) between 3,000 and 25,000 V/m, or (j) between 10,000 and 25,000 V/m.

Further, in various embodiments, at an example distance D=3 mm, parameters of stylus 10 may be selected and/or adjusted such that electrode 16 provides an electric field strength of (a) at least 1,000 V/m, or (b) at least 3,000 V/m, or (c) at least 10,000 V/m, or (d) at least 20,000 V/m, or (e) between 1,000 and 50,000 V/m, or (f) between 3,000 and 50,000 V/m, or (g) between 10,000 and 50,000 V/m, or (h) between 1,000 and 25,000 V/m, or (i) between 3,000 and 25,000 V/m, or (j) between 10,000 and 25,000 V/m.

Further, in various embodiments, at an example distance D=5 mm, parameters of stylus 10 may be selected and/or adjusted such that electrode 16 provides an electric field strength of (a) at least 1,000 V/m, or (b) at least 3,000 V/m, or (c) at least 10,000 V/m, or (d) at least 20,000 V/m, or (e) between 1,000 and 50,000 V/m, or (f) between 3,000 and 50,000 V/m, or (g) between 10,000 and 50,000 V/m, or (h) between 1,000 and 25,000 V/m, or (i) between 3,000 and 25,000 V/m, or (j) between 10,000 and 25,000 V/m.

In other embodiments, parameters of stylus 10 may be selected and/or adjusted such that electrode 16 provides any other desired electric field strength at any desired distance D.

What is claimed is:

1. A handheld, stylus-type input device, comprising:
a handheld body having a first end;
a tip at a first end of the body;
an electrode arranged at least partially within the body; and
a circuit coupled to the electrode and configured to produce an electrical potential on the electrode, which generates an electric field for activating a plurality of sensor nodes of a touch screen when the tip is placed in contact with the touch screen, wherein the electric potential supplied to the electrode is between 500V and 50 kV.

2. The input device of claim 1, wherein when the tip is placed in contact with the touch screen, a contact area between the tip and the touch screen is less than a minimum contact area defined by the touch screen to detect user input.

3. The input device of claim 1, wherein the input device is configured such that, when the tip is placed in contact with the touch screen, the electric field activates one or more sensor nodes outside of a contact area between the tip and the touch screen.

4. The input device of claim 1, further comprising at least one conductive element configured to shape the electric field produced by the electrode.

5. The input device of claim 4, wherein the at least one conductive element comprises a conductive outer housing, wherein the electrode is arranged at least partially within the conductive outer housing.

6. The input device of claim 5, wherein the conductive outer housing comprises an elongated tube, and wherein the electrode is arranged at least partially within the elongated tube, and near a first end of the elongated tube.

7. The input device of claim 4, wherein the at least one conductive element forms a part of an elongated hand-held body of the input device.

8. The input device of claim 1, further comprising a battery coupled to the circuit.

9. The input device of claim 1, wherein the electrode is electrically isolated within the input device.

10. The input device of claim 1, further comprising a boost converter coupled to the electrode.

11. The input device of claim 1, further comprising a voltage multiplier coupled to the electrode.

12. The input device of claim 1, the circuit including a microcontroller configured to output an AC voltage at an output and a transformer coupled to the output and configured to increase the AC voltage.

13. The input device of claim 12, wherein the microcontroller is configured to receive a feedback voltage and automatically control the electric potential on the electrode based on the feedback voltage.

14. The input device of claim 8, comprising circuitry between the at least one battery and the electrode to supply the electrode with a voltage of between 1 kV and 10 kV.

15. The input device of claim 1, wherein the electrode is arranged at a predefined distance from a contact point of the tip such that when the contact point of the tip is placed in the contact with the touch screen, the electrode is spaced apart from the touch screen by approximately the predefined distance.

16. The input device of claim 1, wherein the tip is electrically insulated to prevent discharge between the electrode and the touch screen.

17. A handheld, stylus-type input device, comprising:
a handheld body having a first end;
a tip at a first end of the body;
an elongated electrode arranged at least partially within the body and extending along a direction of a longitudinal axis; and
a circuit coupled to the electrode and configured to produce an electrical potential on the electrode, which generates an electric field;
wherein in a plane extending perpendicular to the longitudinal axis and passing through a forward-most point or surface of the tip, and at a distance of 3 mm from a point of intersection between the longitudinal axis and the plane, the electric field generated by the electrode has a field strength of at least 1,000 V/m.

18. The input device of claim 17, wherein in the plane and at the distance of 3 mm, the electric field generated by the electrode has a field strength of between 3,000 V/m and 50,000 V/m.

19. An apparatus, comprising:
a touch screen having an array of sensor nodes; and
a handheld, stylus-type input device, comprising:
a handheld body having a first end;
a tip at a first end of the body;
at least one battery;
an electrode arranged at least partially within the body; and
a circuit between the at least one battery and the electrode coupled to the battery and the electrode and configured to produce an electrical potential on the electrode with a voltage of between 500V and 50 kV, which generates an electric field for activating a plurality of the sensor nodes of the touch screen when the tip is placed in contact with the touch screen.

20. The apparatus of claim 19, wherein the voltage is between 1 kV and 10 kV.

* * * * *